United States Patent
Maruyama et al.

(10) Patent No.: US 12,390,968 B2
(45) Date of Patent: Aug. 19, 2025

(54) PLASTICIZING DEVICE, INJECTION MOLDING APPARATUS, AND THREE-DIMENSIONAL SHAPING APPARATUS

(71) Applicant: SEIKO EPSON CORPORATION, Tokyo (JP)

(72) Inventors: Hidenobu Maruyama, Azumino (JP); Kazunobu Maruyama, Shiojiri (JP); Masato Sugano, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 123 days.

(21) Appl. No.: 17/445,514

(22) Filed: Aug. 20, 2021

(65) Prior Publication Data

US 2022/0055275 A1 Feb. 24, 2022

(30) Foreign Application Priority Data

Aug. 24, 2020 (JP) .................. 2020-140803

(51) Int. Cl.
 *B29C 45/46* (2006.01)
 *B29C 45/20* (2006.01)
 (Continued)

(52) U.S. Cl.
 CPC ............ *B29C 45/464* (2013.01); *B29C 45/20* (2013.01); *B29C 45/60* (2013.01);
 (Continued)

(58) Field of Classification Search
 CPC ..... B29C 45/18; B29C 45/1808; B29C 31/04; B29C 64/321; B29C 64/343;
 (Continued)

(56) References Cited

U.S. PATENT DOCUMENTS 1,190,325 A * 7/1916 Rosenthal ............... G01F 11/24
                                                        222/548
1,400,747 A * 12/1921 Hopwood .............. B65D 88/64
                                                        222/409
(Continued)

FOREIGN PATENT DOCUMENTS

CN          110524821          12/2019
DE          19537111 A1   *    4/1997
(Continued)

OTHER PUBLICATIONS

Machine translation of Noguchi, JP-3189984-B2, originally published 2001 (Year: 2023).*

Primary Examiner — Susan D Leong
Assistant Examiner — Jennifer L Groux
(74) Attorney, Agent, or Firm — WORKMAN NYDEGGER

(57) ABSTRACT

A plasticizing device includes a plasticizing mechanism including a feeding port for receiving a material and configured to plasticize the material to generate a melted material and a material feeding mechanism configured to feed the material to the plasticizing mechanism. The material feeding mechanism includes a housing including a depositing port communicating with the feeding port, the housing storing the material, and a rotating member housed in the housing and capable of rotating along an inner edge of the housing. A plurality of through-holes are provided in the rotating member at intervals along an outer circumference of the rotating member. When the rotating member rotates and any one of the plurality of through-holes and the depositing port communicate, the material stored in the housing is fed from the feeding port to the plasticizing mechanism through the depositing port.

15 Claims, 9 Drawing Sheets

(51) Int. Cl.
*B29C 45/60* (2006.01)
*B29C 45/76* (2006.01)
*B29C 64/209* (2017.01)
*B29C 64/314* (2017.01)
*B29C 64/321* (2017.01)
*B33Y 30/00* (2015.01)

(52) U.S. Cl.
CPC ........ *B29C 45/7613* (2013.01); *B29C 64/209* (2017.08); *B29C 64/314* (2017.08); *B29C 64/321* (2017.08); *B29C 2945/76006* (2013.01); *B29C 2945/7613* (2013.01); *B29C 2945/76354* (2013.01); *B29C 2945/76605* (2013.01); *B29C 2945/76665* (2013.01); *B33Y 30/00* (2014.12)

(58) Field of Classification Search
CPC ... B29C 64/209; B29C 64/118; B29C 48/286; B29C 2948/92828; B29C 64/255; B29C 64/20; B29C 48/501; B29C 43/34; B29C 31/02; B29C 48/2552; B29C 64/329; B29C 64/307; B29C 2948/92333; B29C 41/36; B29C 2043/3433; B29C 2945/76846; B29C 31/00; B29C 2045/1891; B29C 2945/76367; B29C 48/285; B29C 48/288; B29C 2045/1875; B29C 2945/76331; B29C 2945/76354; B29C 2945/76809; B29C 2945/76832; B29C 31/06; B29C 31/061; B65D 83/0083; B65D 83/06; B65D 88/68; B65D 83/54; B65D 83/00; B65D 90/58; B65D 90/582; B65D 90/585; B65D 90/587; B65D 90/60; B65D 90/62; B65D 90/623; B65D 88/64; B65D 83/04; B33Y 30/00; B33Y 10/00; B33Y 40/00; B33Y 40/10; B29B 7/603; B29B 7/24; B29B 7/26; B29B 7/183; B29B 7/44; B22F 10/18; B22F 3/20; B22F 12/57; B22F 12/52; B01F 35/71; B01F 35/754; B65B 1/30; B65B 1/10; B65B 37/08; G01F 11/24; G01F 11/42; G01F 11/46; G01F 13/001; B65G 65/4836; B65G 65/4872; B65G 65/4809; B65G 65/48; B65G 65/40; B21C 31/02; B30B 15/302

See application file for complete search history.

(56) References Cited

U.S. PATENT DOCUMENTS

| | | | | |
|---|---|---|---|---|
| 2,762,530 | A * | 9/1956 | Shannon | B30B 15/302 222/440 |
| 3,266,677 | A * | 8/1966 | Hamilton | B30B 15/302 222/410 |
| 3,648,900 | A * | 3/1972 | Voigt | A47G 19/34 222/168.5 |
| 3,985,244 | A * | 10/1976 | Gessler | B65D 88/64 222/459 |
| 4,893,737 | A * | 1/1990 | Borjesson | A47G 19/34 222/360 |
| 5,791,526 | A * | 8/1998 | Landais | A47J 31/404 222/325 |
| 7,431,583 | B2 | 10/2008 | Takatsugi et al. | |
| 10,583,604 | B2 | 3/2020 | Yuyama | |
| 2004/0089677 | A1* | 5/2004 | Schwartzman | B65D 83/06 222/548 |
| 2005/0269346 | A1* | 12/2005 | Limback | B01F 35/714112 221/186 |
| 2007/0026096 | A1* | 2/2007 | Takatsugi | B29C 45/18 425/587 |
| 2007/0295755 | A1 | 12/2007 | Kinzie et al. | |
| 2017/0008230 | A1 | 1/2017 | Yuyama | |
| 2017/0291364 | A1* | 10/2017 | Womer | B29C 64/106 |
| 2019/0061243 | A1* | 2/2019 | Saito | B29C 64/35 |
| 2019/0358903 | A1 | 11/2019 | Watanabe et al. | |
| 2020/0187547 | A1* | 6/2020 | Iwasaki | B65B 37/20 |
| 2020/0198241 | A1* | 6/2020 | Swier | B33Y 10/00 |

FOREIGN PATENT DOCUMENTS

| | | |
|---|---|---|
| EP | 0374418 A1 * | 6/1990 |
| JP | S62-199812 A | 9/1987 |
| JP | 05-285954 | 11/1993 |
| JP | H06-053124 U | 7/1994 |
| JP | H06-190831 A | 7/1994 |
| JP | H08-309819 A | 11/1996 |
| JP | 3189984 B2 * | 7/2001 |
| JP | 2007-030487 A | 2/2007 |
| JP | 2010-241016 A | 10/2010 |
| JP | 2017-030189 A | 2/2017 |
| JP | 2018-099778 A | 6/2018 |
| WO | WO-2011085946 A1 * | 7/2011 |
| WO | 2015/129733 A | 9/2015 |
| WO | 2016-118994 | 8/2016 |
| WO | WO-2018056988 A1 * | 3/2018 |

* cited by examiner

PLASTICIZING DEVICE, INJECTION MOLDING APPARATUS, AND THREE-DIMENSIONAL SHAPING APPARATUS

The present application is based on, and claims priority from JP Application Serial Number 2020-140803, filed Aug. 24, 2020, the disclosure of which is hereby incorporated by reference herein in its entirety.

BACKGROUND

1. Technical Field

The present disclosure relates to a plasticizing device, an injection molding apparatus, and a three-dimensional shaping apparatus.

2. Related Art

There has been known an injection molding apparatus that feeds a material plasticized by a plasticizing device to a cavity formed by a pair of molds and ejects the material from a nozzle.

For example, JP-A-2010-241016 (Patent Literature 1) describes a plasticizing and delivering device including a rotor on which a spiral groove is formed, a barrel that is in contact with an end face of the rotor, a material inflow passage communicating with the spiral groove being formed in the center of the barrel. Pellet-like resin used as a material is stored in a hopper and fed from the hopper to a feeding port located at the radial direction outer side end portion of the spiral groove.

In the plasticizing and delivering device described in Patent Literature 1, the material is fed to the rotor when the rotor rotates and the feeding port of the rotor and a depositing port of the hopper overlap. Accordingly, if a large amount of the material is deposited in the hopper, in some case, the hopper is clogged with the material near the depositing port and the material is not fed to the rotor.

SUMMARY

A plasticizing device according to an aspect of the present disclosure includes: a plasticizing mechanism including a feeding port for receiving a material and configured to plasticize the material to generate a melted material; and a material feeding mechanism configured to feed the material to the plasticizing mechanism. The material feeding mechanism includes: a housing including a depositing port communicating with the feeding port, the housing storing the material; and a rotating member housed in the housing and capable of rotating along an inner edge of the housing. A plurality of through-holes are provided in the rotating member at intervals along an outer circumference of the rotating member. When the rotating member rotates and any one of the plurality of through-holes and the depositing port communicate, the material stored in the housing is fed from the feeding port to the plasticizing mechanism through the depositing port.

An injection molding apparatus according to an aspect of the present disclosure includes: a plasticizing device that plasticizes a material into a melted material; and a nozzle that ejects, to a mold, the melted material fed from the plasticizing device. The plasticizing device includes: a plasticizing mechanism including a feeding port for receiving the material and configured to plasticize the material to generate the melted material; and a material feeding mechanism configured to feed the material to the plasticizing mechanism. The material feeding mechanism includes: a housing including a depositing port communicating with the feeding port, the housing storing the material; and a rotating member housed in the housing and capable of rotating along an inner edge of the housing. A plurality of through-holes are provided in the rotating member at intervals along an outer circumference of the rotating member. When the rotating member rotates and any one of the plurality of through-holes and the depositing port communicate, the material stored in the housing is fed from the feeding port to the plasticizing mechanism through the depositing port.

A three-dimensional shaping apparatus according to an aspect of the present disclosure is a three-dimensional shaping apparatus that shapes a three-dimensional shaped object, the three-dimensional shaping apparatus including: a plasticizing device that plasticizes a material into a melted material; and a nozzle that discharges, toward a stage, the melted material fed from the plasticizing device. The plasticizing device includes: a plasticizing mechanism including a feeding port for receiving the material and configured to plasticize the material to generate the melted material; and a material feeding mechanism configured to feed the material to the plasticizing mechanism. The material feeding mechanism includes: a housing including a depositing port communicating with the feeding port, the housing storing the material; and a rotating member housed in the housing and capable of rotating along an inner edge of the housing. A plurality of through-holes are provided in the rotating member at intervals along an outer circumference of the rotating member. When the rotating member rotates and any one of the plurality of through-holes and the depositing port communicate, the material stored in the housing is fed from the feeding port to the plasticizing mechanism through the depositing port.

DESCRIPTION OF EXEMPLARY EMBODIMENTS

Preferred embodiments of the present disclosure are explained in detail below with reference to the drawings.

The embodiments explained below do not unduly limit the content of the present disclosure described in the appended claims. Not all of components explained below are essential constituent elements of the present Disclosure.

1. Injection Molding Apparatus 1.1 Overall Configuration

Figure 1:
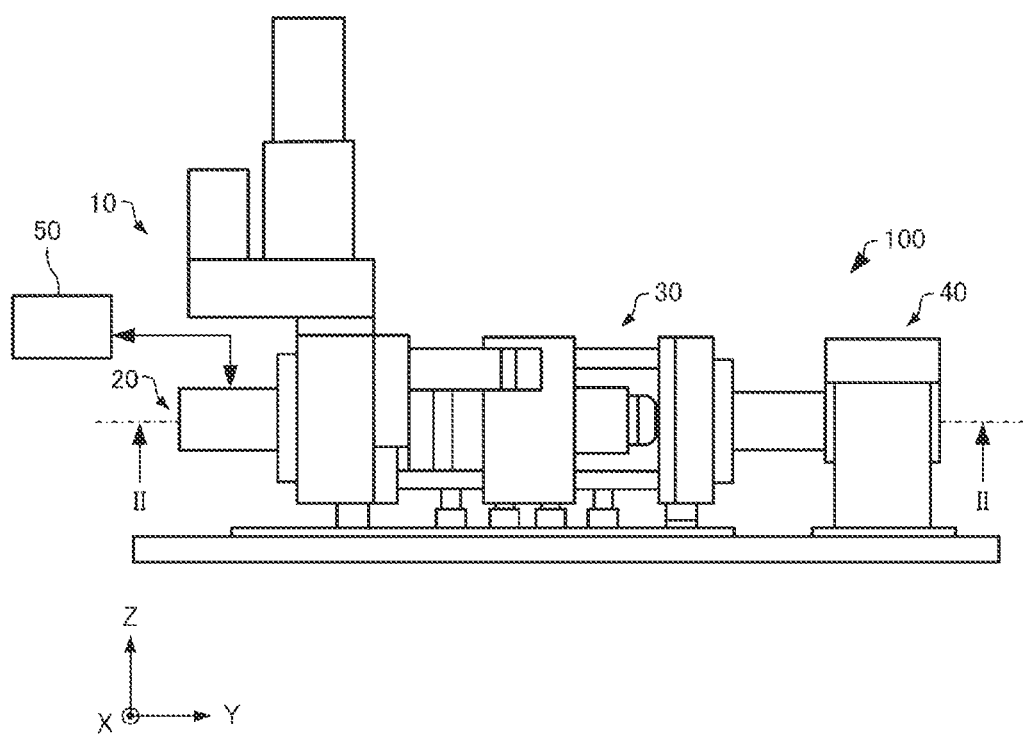
FIG. 1 is a side view schematically showing an injection molding apparatus according to an embodiment.

First, an injection molding apparatus according to an embodiment is explained with reference to the drawings. FIG. 1 is a side view schematically showing an injection molding apparatus 100 according to this embodiment. In FIG. 1, an X axis, a Y axis, and a Z axis are shown as three axes orthogonal to one another. An X-axis direction and a Y-axis direction are, for example, the horizontal directions. A Z-axis direction is, for example, the vertical direction.

The injection molding apparatus 100 includes, as shown in FIG. 1, an ejecting section 20, a die section 30, a die clamping section 40, and a control section 50.

The ejecting section 20 plasticizes a material fed from a material feeding mechanism 10 into a melted material. The ejecting section 20 ejects the melted material toward the die section 30. A detailed configuration of the material feeding mechanism 10 is explained below.

Plasticizing is a concept including melting and means changing a solid to a state having fluidity. Specifically, in the case of a material in which glass transition occurs, plasticizing means raising the temperature of the material to a glass transition point or higher. In the case of a material in which glass transition does not occur, plasticizing means raising the temperature of the material to a melting point or higher.

A cavity equivalent to the shape of a molded article is formed in the die section 30. The melted material ejected from the ejecting section 20 flows into the cavity. The melted material is cooled and solidified to generate the molded article.

The die clamping section 40 opens and closes the die section 30. The die clamping section 40 opens the die section after the melted material is cooled and solidified. Consequently, the molded article is discharged to the outside.

The control section 50 is configured by, for example, a computer including a processor, a main storage device, and an input and output interface that receives signals from and outputs signals to the outside. For example, the processor executes a program read to the main storage device, whereby the control section 50 exerts various functions. Specifically, the control section 50 controls the ejecting section 20 and the die clamping section 40. The control section 50 may not be configured by the computer and may be configured by a combination of a plurality of circuits. Specific control of the control section 50 is explained below.

1.2. Specific Configuration

Figure 2:
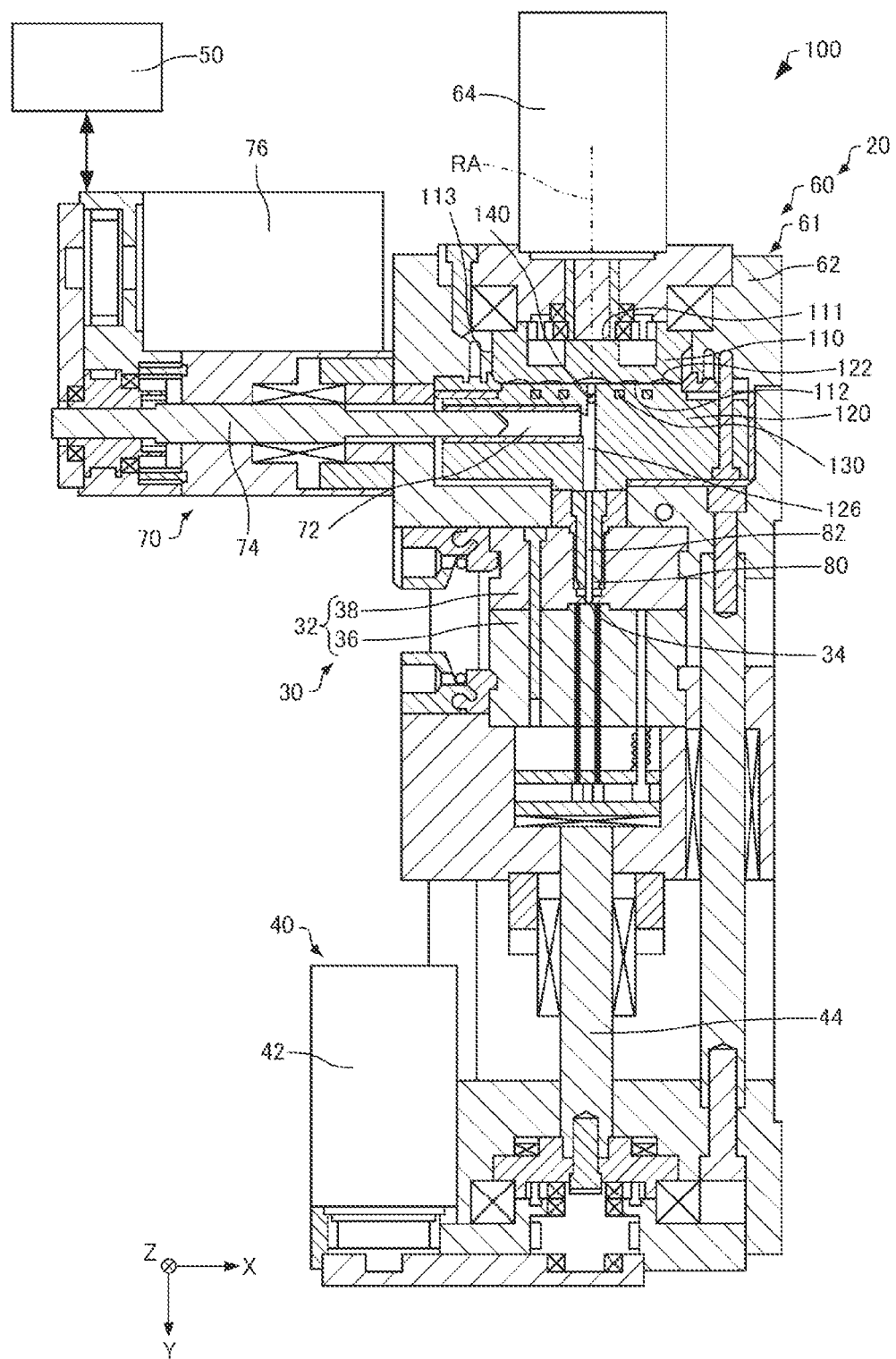
FIG. 2 is a sectional view schematically showing the injection molding apparatus according to the embodiment.

FIG. 2 is a II-II line sectional view of FIG. 1 schematically showing the injection molding apparatus 100. The ejecting section 20 includes, as shown in FIG. 2, for example, a plasticizing device 60 including a plasticizing mechanism 61, an ejecting mechanism 70, and a nozzle 80.

The plasticizing mechanism 61 is configured to plasticize the material fed from the material feeding mechanism 10 to generate a paste-like melted material having fluidity and guide the melted material to the ejecting mechanism 70. The plasticizing mechanism 61 includes, for example, a screw case 62, a first driving motor 64, a flat screw 110, a barrel 120, a heating section 130, and a check valve 140.

The screw case 62 is a housing that houses the flat screw 110. The flat screw 110 is housed in a space surrounded by the screw case 62 and the barrel 120.

The first driving motor 64 is provided in the screw case 62. The first driving motor 64 rotates the flat screw 110. The first driving motor 64 is controlled by the control section 50.

Figure 3:
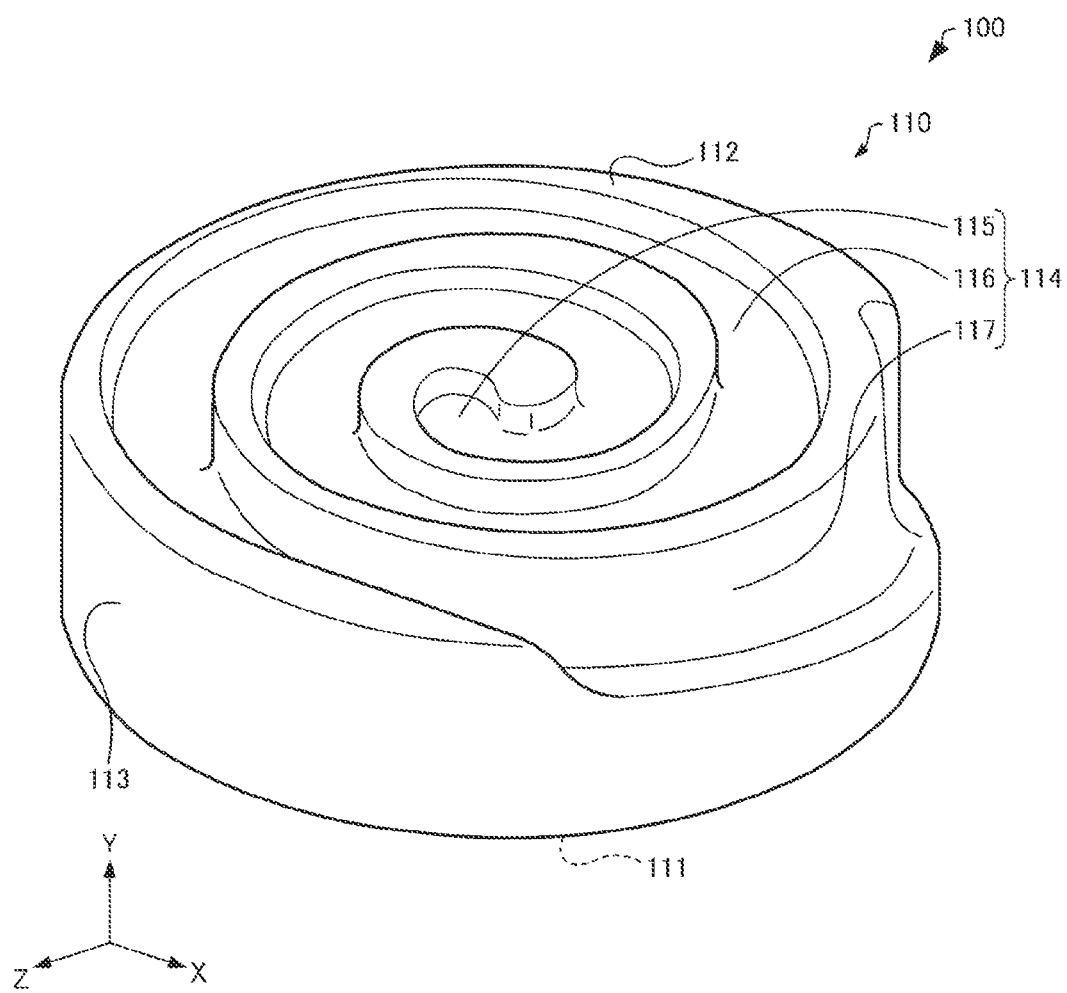
FIG. 3 is a perspective view schematically showing a flat screw of the injection molding apparatus according to the embodiment.

The flat screw 110 has a substantially columnar shape, the size of which in a rotation axis RA direction is smaller than the size thereof in a direction orthogonal to the rotation axis RA direction. In the illustrated example, the rotation axis RA is parallel to the Y axis. The flat screw 110 rotates around the rotation axis RA with torque generated by the first driving motor 64. The flat screw 110 includes a main surface 111, a groove forming surface 112 on the opposite side of the main surface 111, and a connecting surface 113 connecting the main surface 111 and the groove forming surface 112. FIG. 3 is a perspective view schematically showing the flat screw 110. For convenience, in FIG. 3, a state in which a vertical positional relation is reversed from a state shown in FIG. 2 is shown. In FIG. 2, the flat screw 110 is simplified and illustrated.

As shown in FIG. 3, a first groove 114 is provided on the groove forming surface 112 of the flat screw 110. The first groove 114 includes, for example, a center section 115, a groove connecting section 116, and a material introducing section 117. The center section 115 is opposed to a communication hole 126 provided in the barrel 120. The center section 115 communicates with the communication hole 126. The groove connecting section 116 connects the center section 115 and the material introducing section 117. In an example shown in FIG. 3, the groove connecting section 116 is provided in a swirl shape from the center section 115 toward the outer circumference of the groove forming surface 112. The material introducing section 117 is provided on the outer circumference of the groove forming surface 112. That is, the material introducing section 117 is provided on the connecting surface 113 of the flat screw 110. The material fed from the material feeding mechanism 10 is introduced into the first groove 114 from the material introducing section 117 and conveyed to the communication hole 126 provided in the barrel 120 through the groove connecting section 116 and the center section 115. The number of first grooves 114 is not particularly limited. Two or more first grooves 114 may be provided.

Figure 4:
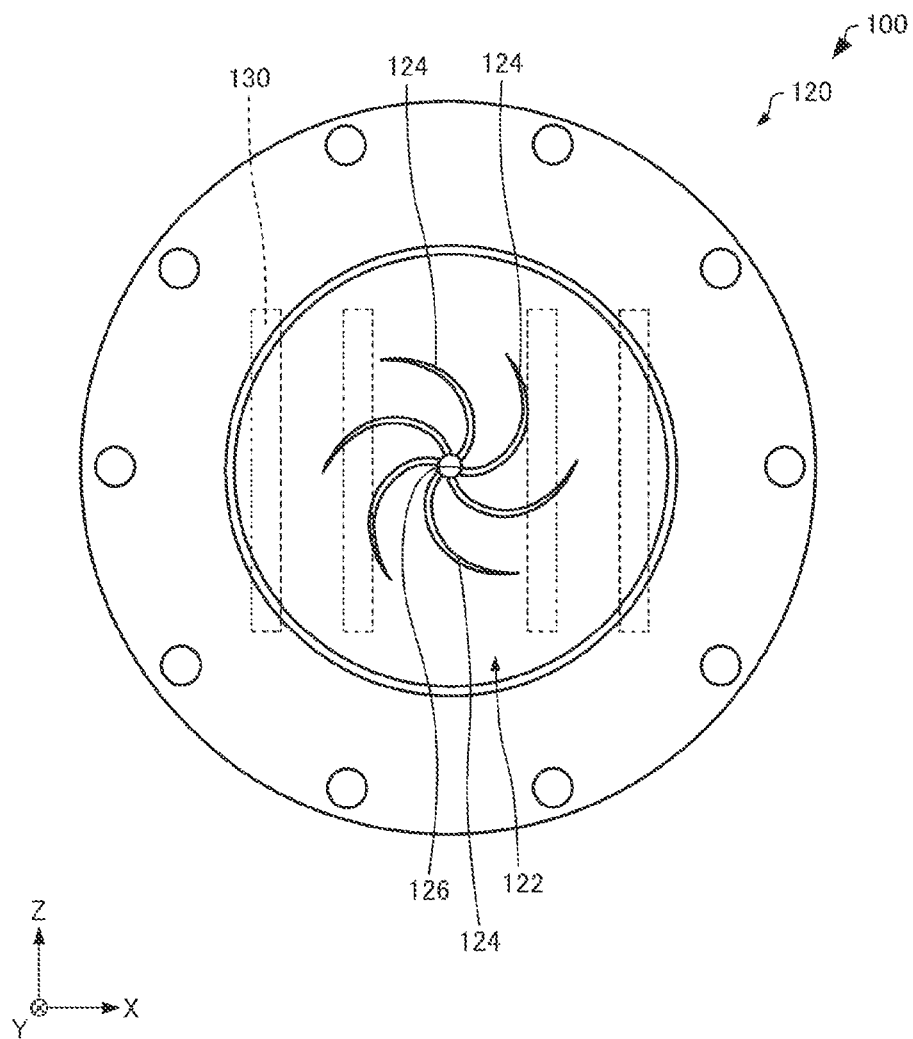
FIG. 4 is a plan view schematically showing a barrel of the injection molding apparatus according to the embodiment.

As shown in FIG. 2, the barrel 120 is provided to be connected to the flat screw 110. The barrel 120 has an opposed surface 122 opposed to the groove forming surface 112 of the flat screw 110. The communication hole 126 is provided in the center of the opposed surface 122. FIG. 4 is a plan view schematically showing the barrel 120. For convenience, in FIG. 2, the barrel 120 is simplified and illustrated.

As shown in FIG. 4, a plurality of second grooves 124 and the communication hole 126 are provided on the opposed surface 122 of the barrel 120. In an example shown in FIG. 4, six second grooves 124 are provided. However, the number of second grooves 124 is not particularly limited. The plurality of second grooves 124 are provided around the communication hole 126 when viewed from the Y-axis direction. One ends of the second grooves 124 are connected to the communication hole 126. The second grooves 124 extend in a swirl shape from the communication hole 126 toward the outer circumference of the opposed surface 122. The second grooves 124 have a function of guiding the melted material to the communication hole 126.

The shape of the second grooves 124 is not particularly limited and may be, for example, a linear shape. The second grooves 124 may not be provided on the opposed surface 122. However, when considering efficiently guiding the melted material to the communication hole 126, the second grooves 124 are preferably provided on the opposed surface 122.

The heating section 130 heats a material fed to between the flat screw 110 and the barrel 120. The heating section 130 is provided in, for example, the barrel 120. In the example shown in FIG. 4, the heating section 130 is configured by four heaters provided in the barrel 120. An output of the heating section 130 is controlled by the control section 50. The plasticizing mechanism 61 heats the material while conveying the material toward the communication hole 126 with the flat screw 110, the barrel 120, and the heating section 130 to generate a melted material and causes the generated melted material to flow out from the communication hole 126 to the ejecting mechanism 70.

As shown in FIG. 2, the check valve 140 is provided in the communication hole 126. The check valve 140 prevents a backflow of the melted material from the communication hole 126 to the first groove 114 provided in the flat screw 110.

The ejecting mechanism 70 includes, for example, a cylinder 72, a plunger 74, and a plunger driving section 76. The cylinder 72 is a substantially cylindrical member connected to the communication hole 126. The plunger 74 moves on the inside of the cylinder 72. The plunger 74 is driven by the plunger driving section 76 configured by a motor, a gear, and the like. The plunger driving section 76 is controlled by the control section 50.

The ejecting mechanism 70 slides the plunger 74 in the cylinder 72 to thereby execute measuring operation and ejecting operation. The measuring operation indicates operation for moving the plunger 74 in a −X-axis direction away from the communication hole 126 to thereby guide the melted material located in the communication hole 126 into the cylinder 72 and measuring the melted material in the cylinder 72. The ejecting operation indicates operation for moving the plunger 74 in a +X-axis direction approaching the communication hole 126 to thereby eject the melted material in the cylinder 72 to the die section 30 via the nozzle 80.

A nozzle hole 82 communicating with the communication hole 126 is provided in the nozzle 80. The melted material fed from the plasticizing mechanism 61 is ejected to a molding die 32 of the die section 30 through the nozzle hole 82. Specifically, the measuring operation and the ejecting operation explained above are executed, whereby the melted material measured in the cylinder 72 is sent from the ejecting mechanism 70 to the nozzle hole 82 via the communication hole 126. The melted material is ejected to the die section 30 from the nozzle hole 82.

The die section 30 includes the molding die 32. The molding die 32 is a mold. The melted material sent to the nozzle hole 82 is ejected to a cavity 34 of the molding die 32 from the nozzle hole 82. Specifically, the molding die 32 includes a movable die 36 and a stationary die 38 opposed to each other and includes the cavity 34 between the movable die 36 and the stationary die 38. The cavity 34 is a space equivalent to the shape of the molded article. The material of the movable die 36 and the stationary die 38 is metal. The material of the movable die 36 and the stationary die 38 may be ceramics or resin.

The die clamping section 40 includes, for example, a die driving section 42 and a ball screw section 44. The die driving section 42 is configured by, for example, a motor and a gear. The die driving section 42 is connected to the movable die 36 via the ball screw section 44. Driving of the die driving section 42 is controlled by the control section 50.

The ball screw section 44 transmits power generated by the driving of the die driving section 42 to the movable die 36. The die clamping section 40 moves the movable die 36 with the die driving section 42 and the ball screw section 44 to thereby open and close the die section 30.

1.3. Material Feeding Mechanism and the Like

Figure 5:
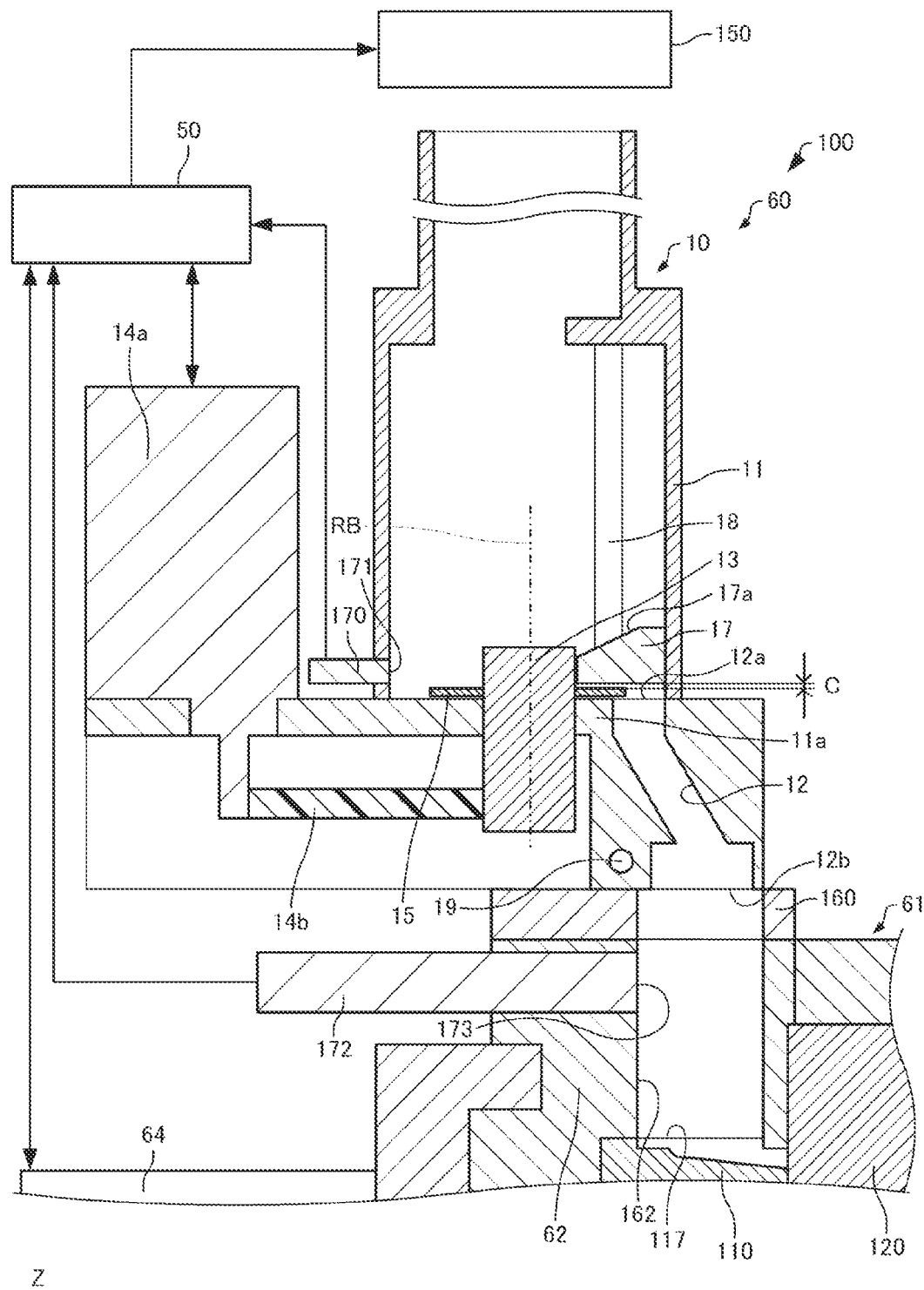
FIG. 5 is a sectional view schematically showing a plasticizing device of the injection molding apparatus according to the embodiment.
Figure 6:
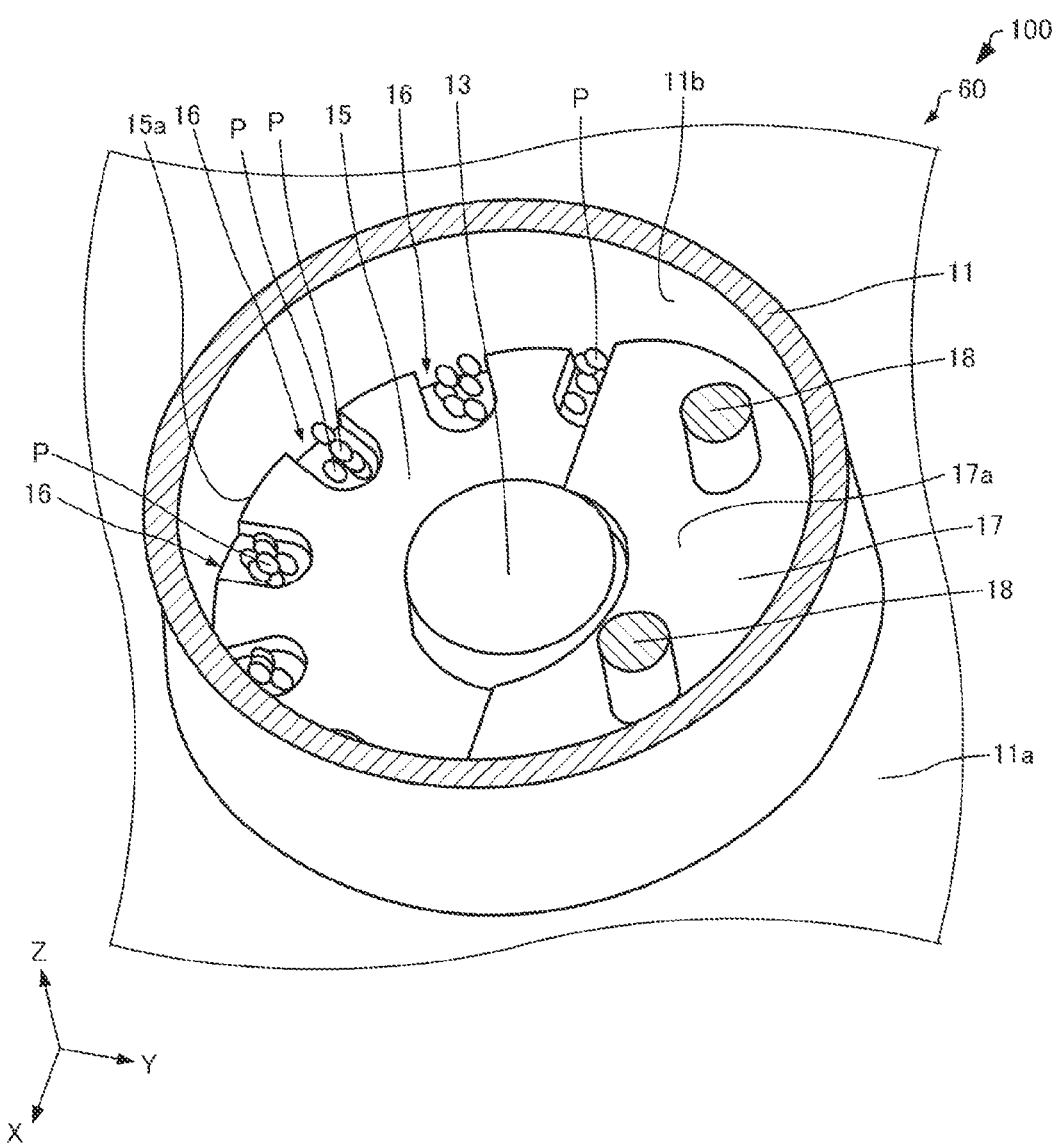
FIG. 6 is a perspective view schematically showing the plasticizing device of the injection molding apparatus according to the embodiment.
Figure 7:
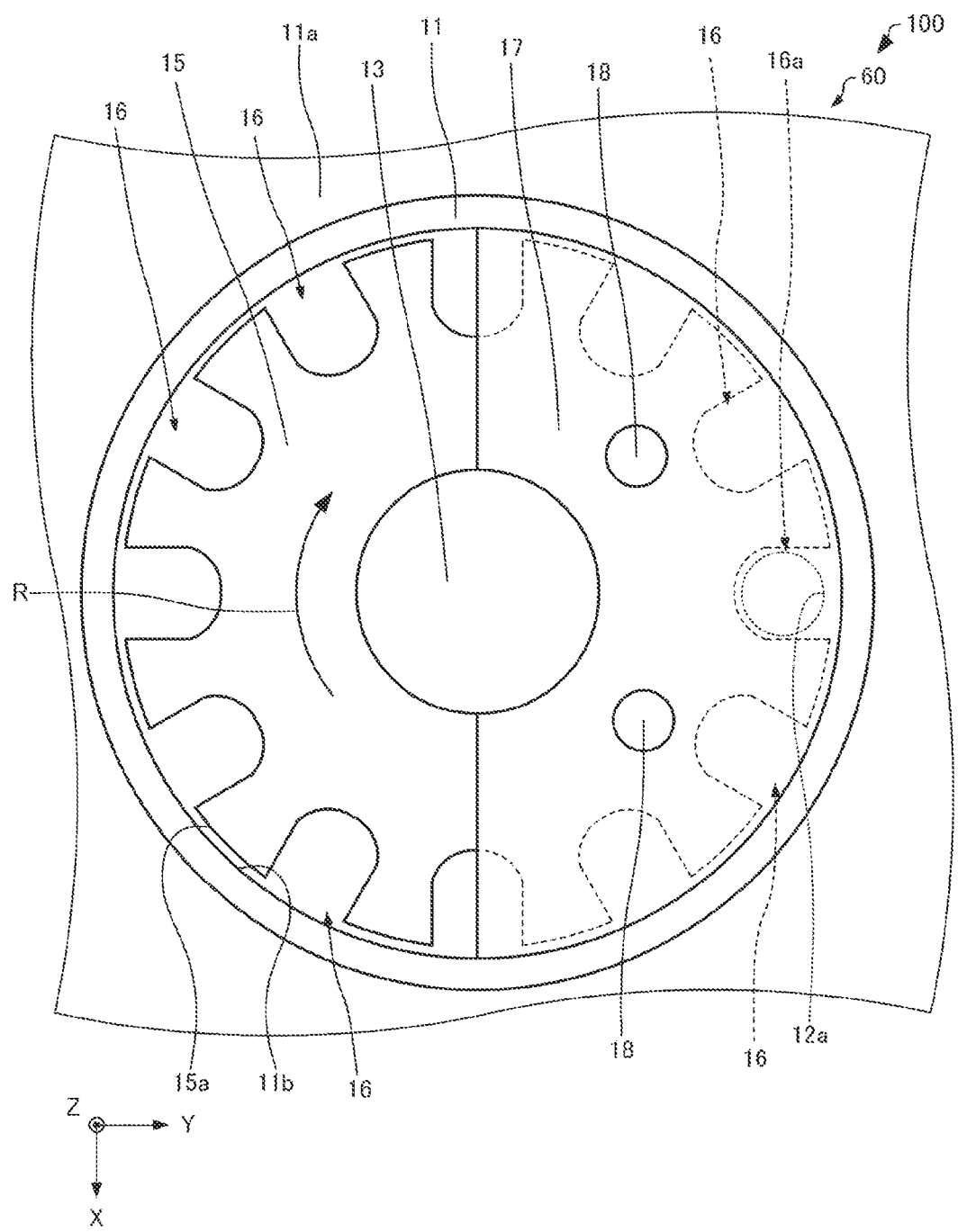
FIG. 7 is a plan view schematically showing the plasticizing device of the injection molding apparatus according to the embodiment.

FIG. 5 is a sectional view schematically showing the plasticizing device 60 of the injection molding apparatus 100 and is a sectional view of the injection molding apparatus 100 shown in FIG. 1 taken along a plane parallel to a YZ plane including the Y axis and the Z axis. FIG. 6 is a sectional perspective view schematically showing the material feeding mechanism 10 of the injection molding apparatus 100. FIG. 7 is a plan view schematically showing the material feeding mechanism 10 of the injection molding apparatus 100.

The plasticizing device 60 includes, as shown in FIGS. 5 to 7, the material feeding mechanism 10 and the plasticizing mechanism 61 explained above, a material supply mechanism 150, a coupling section 160, a first material sensor 170, and a second material sensor 172. For convenience, in FIG. 1, illustration of the material supply mechanism 150 is omitted.

The material supply mechanism 150 is configured to supply a material P to a housing 11 of the material feeding mechanism 10. In an example shown in FIG. 6, the material P is a pellet-like material. The material P is, for example, an MIM (Metal Injection Molding) material containing metal particles and thermoplastic resin.

Examples of the material of the metal particles contained in the material P include single metal such as magnesium (Mg), iron (Fe), cobalt (Co), chrome (Cr), aluminum (Al), titanium (Ti), copper (Cu), and nickel (Ni), an alloy containing one or more of these kinds of metal, maraging steel, stainless steel, cobalt chrome molybdenum, a titanium alloy, a nickel alloy, an aluminum alloy, a cobalt alloy, and a cobalt chrome alloy.

Examples of the thermoplastic resin contained in the material P include general-purpose engineering plastic such as polypropylene (PP), polyethylene (PE), polyacetal (POM), poly vinyl chloride (PVC), polyamide (PA), acrylonitrile butadiene styrene (ABS), polylactic acid (PLA), polyphenylene sulfide (PPS), polycarbonate (PC), modified polyphenylene ether, polybutylene terephthalate, and polyethylene terephthalate and engineering plastic such as polysulfone, polyether sulfone, polyphenylene sulfide, polyarylate, polyimide, polyamide imide, polyether imide, and polyether ether ketone (PEEK).

The material P is supplied to the material feeding mechanism 10 from the material supply mechanism 150. The material feeding mechanism 10 is configured to feed the supplied material P to the plasticizing mechanism 61. The material feeding mechanism 10 includes, as shown in FIG. 5, for example, the housing 11, a rotating shaft section 13, a second driving motor 14a, a belt 14b, a rotating member 15, a cover 17, elastic members 18, and a cooling mechanism 19.

The housing 11 stores the material P. Although not illustrated, the material P may be filled in the housing 11. For convenience, in FIGS. 5 and 7, illustration of the material P is omitted. The shape of the housing 11 is not particularly limited if the housing 11 can store the material P.

A communication hole 12 is provided in the housing 11. In an example shown in FIG. 5, the communication hole 12 is provided in a bottom 11a of the housing 11. The communication hole 12 pierces through the bottom 11a. The communication hole 12 includes an introducing port 12a and a depositing port 12b. The introducing port 12a is the end portion on the opposite side of the depositing port 12b of the communication hole 12. In the example shown in FIG. 5, the introducing port 12a is the end portion in a +Z-axis direction of the communication hole 12. The depositing port 12b is an end portion in a −Z-axis direction of the communication hole 12.

The rotating shaft section 13 is provided in, for example, the bottom 11a of the housing 11. In the example shown in FIG. 5, the rotating shaft section 13 is provided to pierce through the bottom 11a. The rotating shaft section 13 rotates around a rotation axis RB with torque generated by the second driving motor 14a. In the example shown in FIG. 5, the rotation axis RB is parallel to the Z axis. The torque of the second driving motor 14a is transmitted to the rotating shaft section 13 via the belt 14b. The second driving motor 14a and the belt 14b are provided on the outside of the housing 11.

The rotating member 15, such as a rotator, is housed in the housing 11. The rotating member 15 is connected to the rotating shaft section 13. The rotating member 15 rotates in an R direction shown in FIG. 7 according to the rotation of the rotating shaft section 13. The rotating member 15 is capable of rotating along an inner edge 11b of the housing 11. The inner edge 11b is the edge on the inner side of the housing 11. The shape of the rotating member 15 is, for example, a substantially disk shape. The material of the rotating member 15 is not particularly limited but is, for example, metal or ceramics.

A plurality of through-holes 16 are provided in the rotating member 15. The plurality of through-holes 16 are provided at intervals along an outer circumference 15a of the rotating member 15. For example, the plurality of through-holes 16 are provided at equal intervals around the rotating shaft section 13. In an example shown in FIG. 7, the through-holes 16 pierce through the rotating member 15 in the Z-axis direction. The through-holes 16 are, for example, cutouts, parts of inner surfaces of which are opened. In the example shown in FIG. 7, the through-holes 16 are cutouts provided on the outer circumference 15a of the rotating member 15. The inner surfaces of the through-holes 16 form the surface of the rotating member 15 defining the through-holes 16. The communication hole 12 enables the through-holes 16 and the depositing port 12b to communicate. In the example shown in FIG. 7, twelve through-holes 16 are provided. However, the number of through-holes 16 is not particularly limited. As shown in FIG. 6, the material P is located in the through-holes 16. Although not illustrated, the material P is located on the rotating member 15 and the cover 17 as well.

When the rotating member 15 rotates and any one of the plurality of through-holes 16 and the depositing port 12b communicate, the material P stored in the housing 11 is fed from the material introducing section 117 to the plasticizing mechanism 61 through the through-holes 16, the introducing port 12a, and the depositing port 12b. In the example shown in FIG. 7, a through-hole 16a among the plurality of through-holes 16 and the introducing port 12a overlap when viewed from the rotation axis RB direction of the rotating member 15. The through-hole 16a and the introducing port 12a overlap, whereby the through-hole 16a and the communication hole 12 communicate.

The cover 17 is housed in the housing 11. The cover 17 is provided above the rotating member 15. In the illustrated example, the cover 17 is provided in the +Z-axis direction of the rotating member 15. The cover 17 covers a part of the rotating member 15. In the illustrated example, the cover 17 covers half of the rotating member 15. As shown in FIG. 7, the introducing port 12a is provided in a position overlapping the cover 17 when viewed from the rotation axis RB direction. In the example shown in FIG. 7, the cover 17 has a shape obtained by cutting an annular member into half. An upper surface 17a of the cover 17 is inclined such that the material P located on the upper surface 17a can be guided to a portion of the rotating member 15 not covered by the cover 17. Clearance C between the cover 17 and the rotating member 15 is, for example, equal to or smaller than a longest dimension of the material P. The longest dimension of the material P is a dimension of the longest line segment among line segments connecting the outer circumference of the material P in a plan view.

The elastic members 18 are provided in the housing 11. In the illustrated example, the elastic members 18 have a bar-like shape. The elastic members 18 are connected to the upper surface 17a of the cover 17 and the inner wall of the housing 11. The elastic members 18 urge the cover 17 to the rotating member 15. In the illustrated example, two elastic members 18 are provided. However, the number of elastic members 18 is not particularly limited. The elastic members 18 are capable of adjusting the clearance C between the cover 17 and the rotating member 15. The cover 17 is capable of moving up and down according to extension and contraction of the elastic members 18.

As shown in FIG. 5, the cooling mechanism 19 is provided in, for example, the bottom 11a of the housing 11. The cooling mechanism 19 is configured to cool the material P. The cooling mechanism 19 is, for example, a cooling pipe in which a coolant flows. Examples of the coolant include water.

The coupling section 160 couples the material feeding mechanism 10 and the plasticizing mechanism 61. In the illustrated example, the coupling section 160 couples the bottom 11a of the housing 11 of the material feeding mechanism 10 and the screw case 62 of the plasticizing mechanism 61. The shape of the coupling section 160 is, for example, a plate shape. A feeding path 162 functioning as a path for feeding the material P is provided in the coupling section 160. The feeding path 162 communicates with the communication hole 12. The feeding path 162 connects the depositing port 12b and the material introducing section 117. In the illustrated example, the feeding path 162 is provided at fixed width from the depositing port 12b to the material introducing section 117. The material introducing section 117 of the plasticizing mechanism 61 is a feeding port for receiving the material P. The depositing port 12b communicates with the material introducing section 117 via the feeding path 162. In the illustrated example, the feeding path 162 is provided in the coupling section 160 and the screw case 62.

The first material sensor 170 detects the material P in the housing 11. The first material sensor 170 is supported by, for example, the housing 11. A distal end 171 of the first material sensor 170 is located in the housing 11. The first material sensor 170 detects presence or absence of the material P in the housing 11. The first material sensor 170 is a proximity sensor such as a high-frequency induction type proximity sensor or a capacitance type proximity sensor.

The second material sensor 172 detects the material P in the feeding path 162. The second material sensor 172 is supported by, for example, the plasticizing mechanism 61. A distal end 173 of the second material sensor 172 is located in the feeding path 162 provided in the plasticizing mechanism 61. The second material sensor 172 detects presence or absence of the material P in the feeding path 162. The second material sensor 172 is a proximity sensor such as a high-frequency induction type proximity sensor or a capacitance type proximity sensor.

The first material sensor 170 and the second material sensor 172 may be a weight sensor or a pressure sensor and may detect a residual amount of the material P by converting the residual amount into a numerical value. One or both of the first material sensor 170 and the second material sensor 172 may not be provided. However, in order to surely detect material shortage, both of the first material sensor 170 and the second material sensor 172 are preferably provided.

1.4. Control Section

The control section 50 controls rotating speed of the rotating member 15 based on, for example, rotating speed of the flat screw 110. The rotating member 15 is controlled based on the rotating speed of the flat screw 110. Specifically, when the rotating speed of the flat screw 110 increases, the control section 50 controls the second driving motor 14a to increase the rotating speed of the rotating member 15. When the rotating speed of the flat screw 110 increases, since plasticization of the material P in the plasticizing mechanism 61 is accelerated, the rotating speed of the rotating member 15 is increased. Consequently, it is possible to prevent the flat screw 110 from idling. The control section 50 may acquire the rotating speed of the flat screw 110 from an output of the first driving motor 64 or may acquire the rotating speed of the flat screw 110 from a not-shown sensor.

The control section 50 controls the rotating speed of the rotating member 15 based on, for example, a torque value of the first driving motor 64. Specifically, the control section 50 acquires the torque value of the first driving motor 64 and, when the acquired torque value is smaller than a predetermined value, controls the second driving motor 14a to increase the rotating speed of the rotating member 15. When the torque value of the first driving motor 64 is smaller than the predetermined value, the rotating member 15 is controlled such that the rotating speed is higher compared with when the torque value of the first driving motor 64 is larger than the predetermined value. When the torque value of the first driving motor 64 is smaller than the predetermined value, since the material P is not fed to the material introducing section 117, the flat screw 110 is likely to be idling. Accordingly, it is possible to eliminate the idling of the flat screw 110 by increasing the rotating speed of the rotating member 15.

The control section 50 controls the rotating speed of the rotating member 15 based on, for example, a torque value of the second driving motor 14a. Specifically, the control section 50 acquires the torque value of the second driving motor 14a and, when the acquired torque value is larger than a predetermined value, controls the second driving motor 14a to reversely rotate the rotating member 15. When the torque value of the second driving motor 14a is larger than the predetermined value, the rotating member 15 rotates in the opposite direction of a rotating direction in which the rotating member 15 rotates when the torque value of the second driving motor 14a is smaller than the predetermined value. When the torque value is larger than the predetermined value, in some case, the material P is bit and caught and the rotating member 15 cannot rotate in the R direction. Accordingly, it is possible to eliminate the catching of the material P by rotating the rotating member 15 in the opposite direction of the R direction.

The control section 50 controls, for example, the material supply mechanism 150. The control section 50 controls the material supply mechanism 150 based on, for example, a detection result of the first material sensor 170 to supply the material P to the housing 11. The material supply mechanism 150 supplies the material P to the housing 11 based on the detection result of the first material sensor 170. Specifically, when the first material sensor 170 detects material shortage, the control section 50 drives the material supply mechanism 150 and supplies the material P to the housing 11. Consequently, it is possible to eliminate the material shortage in the housing 11.

The control section 50 controls, for example, the flat screw 110. Specifically, when the second material sensor 172 detects material shortage, the control section 50 controls the first driving motor 64 to stop the rotation of the flat screw 110. When the second material sensor 172 detects material shortage, the flat screw 110 stops rotating. Consequently, it is possible to prevent the flat screw 110 from idling.

In the above explanation, an example is explained in which one control section 50 performs the control of the rotating member 15 based on the rotating speed of the flat screw 110, the control of the rotating member 15 based on the torque value of the first driving motor 64, the control of the rotating member 15 based on the torque value of the second driving motor 14a, the control of the material supply mechanism 150 based on the detection result of the first material sensor 170, and the control of the flat screw 110 based on the detection result of the second material sensor 172. However, separate control sections may be provided for each of the controls. When considering a reduction in the size of the apparatus, it is preferable to perform the controls with one control section. The control section 50 may perform all of the controls or may perform any one of the controls. The number of controls is not particularly limited.

1.5. Action Effects

The plasticizing device 60 includes the plasticizing mechanism 61 that includes the material introducing section 117 that receives the material P and plasticizes the material P to generate a melted material and the material feeding mechanism 10 configured to feed the material P to the plasticizing mechanism 61. The material feeding mechanism 10 includes the housing 11 including the depositing port 12b communicating with the material introducing section 117, the housing 11 storing the material p, and the rotating member 15 housed in the housing 11 and capable of rotating along the inner edge 11b of the housing 11. In the rotating member 15, the plurality of through-holes 16 are provided at intervals along the outer circumference 15a of the rotating member 15. When the rotating member 15 rotates and any one of the plurality of through-holes 16 and the depositing port 12b communicate, the material P stored in the housing 11 is fed from the material introducing section 117 to the plasticizing mechanism 61 through the depositing port 12b. Accordingly, in the plasticizing device 60, even if a large amount of the material P is deposited in the material feeding mechanism 10, the material P intermittently passes through the depositing port 12b little by little. Therefore, it is possible to make it less likely that the depositing port 12b is clogged with the material P. Consequently, it is possible to prevent a bridge phenomenon from occurring because the material P is not fed to the plasticizing mechanism 61.

In the plasticizing device 60, the material feeding mechanism. 10 includes the cover 17 provided above the rotating member 15 and covering a part of the rotating member 15. The communication hole 12 for enabling the through-holes 16 and the depositing port 12b to communicate is provided in the housing 11. When viewed from the rotation axis RB direction of the rotating member 15, the introducing port 12a, which is the end portion of the communication hole 12 on the opposite side of the depositing port 12b, is provided in the position overlapping the cover 17. Accordingly, in the plasticizing device 60, it is possible to prevent, with the cover 17, the communication hole 12 from being pressed to the material P and clogged with the material P. Further, in a state in which the material P on the rotating member 15 is shaved off by the cover 17, it is possible to send the material P located in the through-holes 16 from the introducing port 12a to the depositing port 12b.

In the plasticizing device 60, the clearance C between the rotating member 15 and the cover 17 is equal to or smaller than the longest dimension of the material P. Accordingly, in the plasticizing device 60, it is possible to rub and cut the material P with the rotating member 15 and the cover 17.

In the plasticizing device 60, the material feeding mechanism 10 includes the elastic members 18 capable of adjusting the clearance C between the rotating member 15 and the cover 17. Accordingly, if the material P is caught between the rotating member 15 and the cover 17, since the elastic members 18 contract, it is possible to prevent the rotation of the rotating member 15 from stopping.

The plasticizing device 60 includes the first material sensor 170 that detects the material P in the housing 11 and the material supply mechanism 150 configured to supply the material P to the housing 11. The material supply mechanism 150 supplies the material P to the housing 11 based on a detection result of the first material sensor 170. Accordingly, in the plasticizing device 60, when the first material sensor 170 detects material shortage, the material P is automatically supplied to the housing 11 by the material supply mechanism 150. Consequently, it is possible to save time for feeding the material P to the housing 11.

In the plasticizing device 60, the rotating member 15 is controlled based on the rotating speed of the flat screw 110. Accordingly, in the plasticizing device 60, it is possible to prevent the flat screw 110 from idling.

In the plasticizing device 60, the rotating member 15 is controlled such that the rotating speed of the rotating member 15 is higher when the torque value of the first driving motor 64 is smaller than the predetermined value compared with when the torque value of the first driving motor 64 is larger than the predetermined value. Accordingly, in the plasticizing device 60, it is possible to eliminate idling of the flat screw 110.

The plasticizing device 60 includes the second driving motor 14a that rotates the rotating member 15. When the torque value of the second driving motor 14a is larger than the predetermined value, the rotating member 15 rotates in the opposite direction of the rotating direction in which the rotating member 15 rotates when the torque value of the second driving motor 14a is smaller than the predetermined value. Accordingly, in the plasticizing device 60, it is possible to eliminate the catching of the material P.

In the plasticizing device 60, the flat screw 110 has the groove forming surface 112 on which the first groove 114 is provided, the first groove 114 includes the material introducing section 117, the plasticizing mechanism 61 includes the barrel 120 having the opposed surface 122 opposed to the groove forming surface 112, and the communication hole 126 communicating with the first groove 114 is provided on the opposed surface 122. Accordingly, in the plasticizing device 60, it is possible to feed the material P to the communication hole 126 via the first groove 114. Further, it is possible to achieve space saving compared with when a bar-like inline screw long in the rotation axis RA direction is used as a screw.

The plasticizing device 60 includes the second material sensor 172 that detects the material P in the feeding path 162 connecting the depositing port 12b and the material introducing section 117. When the second material sensor 172 detects material shortage, the flat screw 110 stops rotation. Accordingly, in the plasticizing device 60, it is possible to prevent the flat screw 110 from idling.

In the plasticizing device 60, the material feeding mechanism 10 includes the cooling mechanism 19 configured to cool the material P. Accordingly, in the plasticizing device 60, it is possible to prevent the material P from melting in the material feeding mechanism 10 with heat of the plasticizing mechanism 61. When the material P melts in the material feeding mechanism 10, the material P condenses and clogging easily occurs.

In the plasticizing device 60, the material feeding mechanism 10 feeds the material P containing the metal particles and the thermoplastic resin. Such a material P made of the MIM material has larger mass and clogging more easily occurs compared with, for example, a material made of only resin. However, in the plasticizing device 60, since the material P can be intermittently fed by the rotating member 15 even if such a MIM material is used, it is possible to prevent the material P from clogging. Further, the material P made of the MIM material has higher thermal conductivity compared with, for example, a material made of only resin. Accordingly, heat of the plasticizing mechanism 61 is easily transmitted to the material P and the material P easily melts and condenses. However, in the plasticizing device 60, since the material P can be intermittently fed by the rotating member 15, it is possible to prevent the heat of the plasticizing mechanism 61 from being transmitted via the material P.

Ceramics may be mixed in the material P besides the metal particles and the thermoplastic resin. Examples of the ceramics include oxide ceramics such as silicon dioxide, titanium dioxide, aluminum oxide, and zirconium oxide and non-oxide ceramics such as aluminum nitride. Further, for example, an additive such as pigment, wax, flame retardant, antioxidant, or heat stabilizer may be mixed in the material P.

Further, a binder may be added to the material P. Examples of the binder include acrylic resin, epoxy resin, silicone resin, cellulose resin, and other kinds of synthetic resin and PLA (polylactic acid), PA (polyamide), PPS (polyphenylene sulfide), and PEEK (polyether ether ketone).

Figure 8:
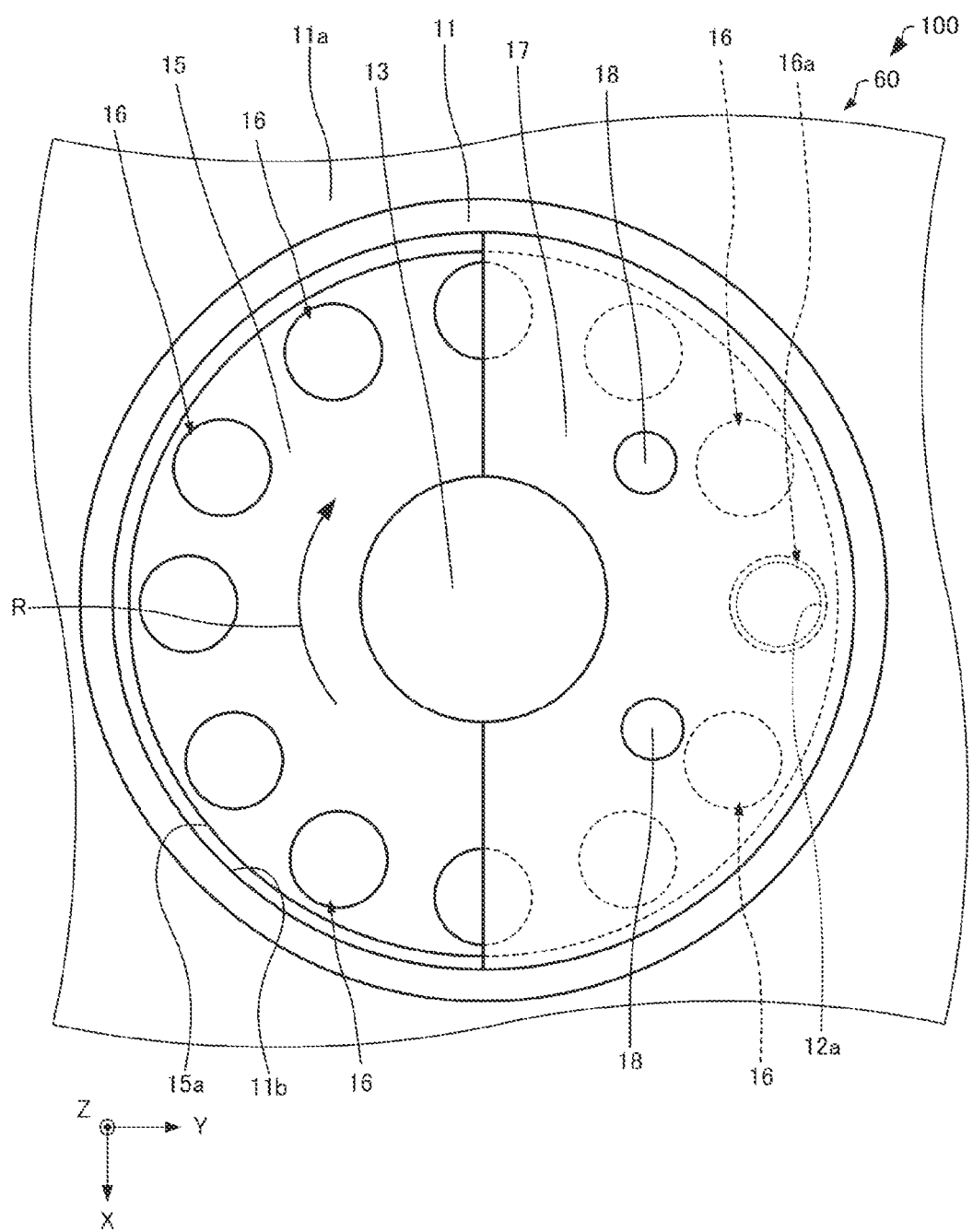
FIG. 8 is a plan view schematically showing the plasticizing device of the injection molding apparatus according to the embodiment.

In the above explanation, an example is explained in which the through-holes 16 are the cutouts, parts of the inner surfaces of which are opened as shown in FIG. 7. However, the through-holes 16 may be through-holes, the inner surfaces of which are not opened as shown in FIG. 8.

In the above explanation, an example is explained in which the material P is the pellet-like material. However, the material P may be, for example, a powder-like material crushed by a crusher.

In the example explained above, the flat screw 110, the size of which in the rotation axis RA direction is smaller than the size thereof in the direction orthogonal to the rotation axis RA direction, is used as the screw. However, a bar-like inline screw long in the rotation axis RA direction may be used instead of the flat screw 110.

In the above explanation, an example is explained in which the injection molding apparatus 100 includes the control section 50 and the plasticizing device 60 does not include a control section. However, the plasticizing device 60 may include the control section 50.

2. Three-Dimensional Shaping Apparatus

A three-dimensional shaping apparatus according to this embodiment is explained with reference to the drawings.

Figure 9:
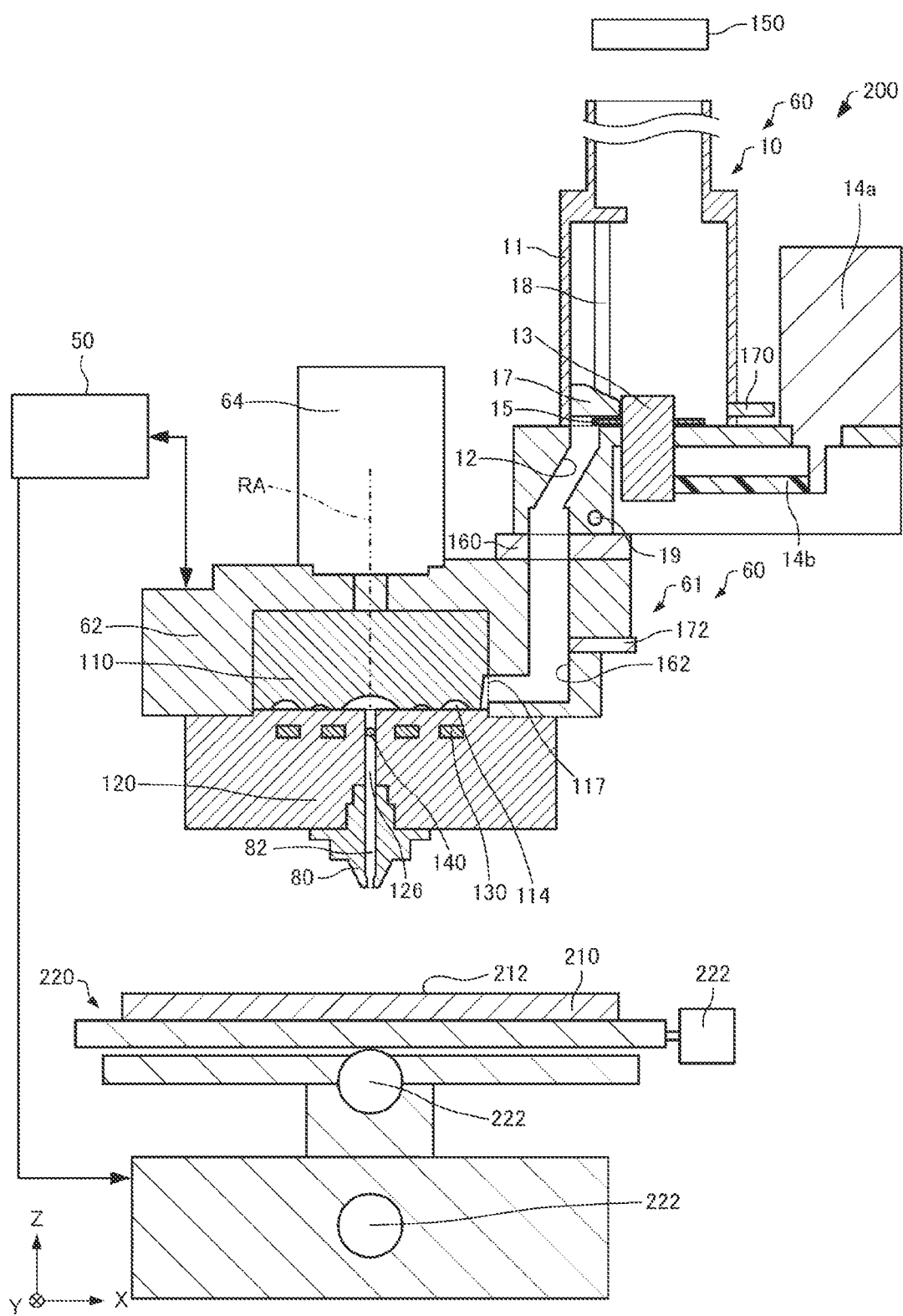
FIG. 9 is a sectional view schematically showing a three-dimensional shaping apparatus according to the embodiment.

FIG. 9 is a side view schematically showing a three-dimensional shaping apparatus 200 according to this embodiment.

The three-dimensional shaping apparatus 200 includes, for example, as shown in FIG. 9, the plasticizing device 60, the nozzle 80, a stage 210, a moving mechanism. 220, and the control section 50. The plasticizing device 60 includes the material feeding mechanism 10, the plasticizing mechanism 61, the material supply mechanism 150, the coupling section 160, the first material sensor 170, and the second material sensor 172. The plasticizing mechanism 61 includes the screw case 62, the first driving motor 64, the flat screw 110, the barrel 120, the heating section 130, and the check valve 140. For convenience, in FIG. 9, the material feeding mechanism 10 is simplified and shown.

The nozzle 80 discharges, toward the stage 210, a melted material supplied from the plasticizing device 60. Specifically, the three-dimensional shaping apparatus 200 drives the moving mechanism 220 while discharging the melted material from the nozzle 80 to the stage 210 and changes relative positions of the nozzle 80 and the stage 210. Consequently, the three-dimensional shaping apparatus 200 shapes a three-dimensional shaped object having a desired shape on the stage 210.

The stage 210 is moved by the moving mechanism 220. The three-dimensional shaped object is formed on a shaping surface 212 of the stage 210.

The moving mechanism 220 changes the relative positions of the nozzle 80 and the stage 210. In an example shown in FIG. 9, the moving mechanism 220 moves the stage 210 with respect to the nozzle 80. The moving mechanism 220 is configured by a three-axis positioner that moves the stage 210 in the X-axis direction, the Y-axis direction, and the Z-axis direction with, for example, driving forces of three motors 222. The motors 222 are controlled by the control section 50.

The moving mechanism 220 may be configured not to move the stage 210 but to move the nozzle 80. Alternatively, the moving mechanism 220 may be configured to move both of the nozzle 80 and the stage 210.

The control section 50 controls the moving mechanism 220 and the plasticizing device 60 based on shaping data acquired in advance to thereby discharge the melted material from the nozzle 80 to a predetermined position on the stage 210 to shape a three-dimensional shaped object.

In the above explanation, an example is explained in which the three-dimensional shaping apparatus 200 includes the control section 50 and the plasticizing device 60 does not include a control section. However, the plasticizing device 60 may include the control section 50.

The present disclosure includes substantially the same configurations as the configurations explained in the embodiment, for example, configurations having the same functions, methods, and results as the functions, the methods, and the results of the configurations explained in the embodiment or configurations having the same objects and effects as the objects and the effects of the configurations explained in the embodiment. The present disclosure includes configurations obtained by replacing nonessential portions of the configurations explained in the embodiment. The present disclosure includes configurations that can achieve the same action effects as the action effects of the configurations explained in the embodiment or configurations that can achieve the same objects as the objects of the configurations explained in the embodiment. The present disclosure includes configurations obtained by adding publicly-known techniques to the configurations explained in the embodiment.

Contents described below are derived from the embodiment explained above.

A plasticizing device according to an aspect of the present disclosure includes: a plasticizing mechanism including a feeding port for receiving a material and configured to plasticize the material to generate a melted material; and a material feeding mechanism configured to feed the material to the plasticizing mechanism. The material feeding mechanism includes: a housing including a depositing port communicating with the feeding port, the housing storing the material; and a rotating member housed in the housing and capable of rotating along an inner edge of the housing. A plurality of through-holes are provided in the rotating member at intervals along an outer circumference of the rotating member. When the rotating member rotates and any one of the plurality of through-holes and the depositing port communicate, the material stored in the housing is fed from the feeding port to the plasticizing mechanism through the depositing port.

With the plasticizing device, even if a large amount of the material is deposited to the material feeding mechanism, since the material intermittently passes through the depositing port little by little, it is possible to make it less likely that the depositing port is clogged with the material. Consequently, it is possible to prevent a bridge phenomenon from occurring because the material is not fed to the plasticizing mechanism.

In the plasticizing device according to the aspect, the material feeding mechanism may include a cover provided above the rotating member and covering a part of the rotating member, a communication hole for enabling the through-hole and the depositing port to communicate may be provided in the housing, and, when viewed from a rotation axis direction of the rotating member, an end portion of the communication hole on an opposite side of the depositing port may be provided in a position overlapping the cover.

With the plasticizing device, it is possible to prevent, with the cover, the communication hole from being pressed to the material and clogged with the material.

In the plasticizing device according to the aspect, clearance between the rotating member and the cover may be equal to or smaller than a longest dimension of the material.

With the plasticizing device, it is possible to rub and cut the material with the rotating member and the cover.

In the plasticizing device according to the aspect, the material feeding mechanism may include an elastic member capable of adjusting clearance between the rotating member and the cover.

With the plasticizing device, if the material is caught between the rotating member and the cover, it is possible to prevent the rotation of the rotating member from stopping because the elastic member contracts.

In the plasticizing device according to the aspect, the plasticizing device may further include: a first material sensor that detects the material in the housing; and a material supply mechanism configured to supply the material to the housing, and the material supply mechanism may supply the material to the housing based on a detection result of the first material sensor.

With the plasticizing device, when the first material sensor detects material shortage, the material is automatically supplied to the housing by the material supply mechanism. Therefore, it is possible to save time for supplying the material to the housing.

In the plasticizing device according to the aspect, the plasticizing mechanism may include: a first driving motor; and a screw rotated by the first driving motor.

In the plasticizing device according to the aspect, the rotating member may be controlled based on rotating speed of the screw.

With the plasticizing device, it is possible to prevent the screw from idling.

In the plasticizing device according to the aspect, when a torque value of the first driving motor is smaller than a predetermined value, the rotating member may be controlled such that rotating speed is higher compared with when the torque value of the first driving motor is larger than the predetermined value.

With the plasticizing device, it is possible to eliminate idling of the screw.

In the plasticizing device according to the aspect, the plasticizing device may further include a second driving motor that rotates the rotating member, and, when a torque value of the second driving motor is larger than a predetermined value, the rotating member may rotate in an opposite direction of a rotating direction in which the rotating member rotates when the torque value of the second driving motor is smaller than the predetermined value.

With the plasticizing device, it is possible to eliminate catching of the material.

In the plasticizing device according to the aspect, the screw may have a groove forming surface on which a groove is provided, the groove may include the feeding port, the plasticizing mechanism may include a barrel having an opposed surface opposed to the groove forming surface, and a communication hole communicating with the groove may be provided on the opposed surface.

With the plasticizing device, it is possible to feed the material to the communication hole via the groove.

In the plasticizing device according to the aspect, the plasticizing device may further include a second material sensor that detects the material in a feeding path connecting the depositing port and the feeding port, and the screw may stop the rotation when the second material sensor detects material shortage.

With the plasticizing device, it is possible to prevent the screw from idling.

In the plasticizing device according to the aspect, the material feeding mechanism may include a cooling mechanism configured to cool the material.

With the plasticizing device, it is possible to prevent the material from melting in the material feeding mechanism with heat of the plasticizing mechanism.

In the plasticizing device according to the aspect, the material feeding mechanism may feed the material containing metal particles and thermoplastic resin.

With the plasticizing device, even if an MIM material with which clogging easily occurs is used, the material can be intermittently fed by the rotating member. Therefore, it is possible to prevent the material from clogging.

An injection molding apparatus according to an aspect of the present disclosure includes: a plasticizing device that plasticizes a material into a melted material; and a nozzle that ejects, to a mold, the melted material fed from the plasticizing device. The plasticizing device includes: a plasticizing mechanism including a feeding port for receiving the material and configured to plasticize the material to generate the melted material; and a material feeding mechanism configured to feed the material to the plasticizing mechanism. The material feeding mechanism includes: a housing including a depositing port communicating with the feeding port, the housing storing the material; and a rotating member housed in the housing and capable of rotating along an inner edge of the housing. A plurality of through-holes are provided in the rotating member at intervals along an outer circumference of the rotating member. When the rotating member rotates and any one of the plurality of through-holes and the depositing port communicate, the material stored in the housing is fed from the feeding port to the plasticizing mechanism through the depositing port.

A three-dimensional shaping apparatus according to an aspect of the present disclosure is a three-dimensional shaping apparatus that shapes a three-dimensional shaped object, the three-dimensional shaping apparatus including: a plasticizing device that plasticizes a material into a melted material; and a nozzle that discharges, toward a stage, the melted material fed from the plasticizing device. The plasticizing device includes: a plasticizing mechanism including a feeding port for receiving the material and configured to plasticize the material to generate the melted material; and a material feeding mechanism configured to feed the material to the plasticizing mechanism. The material feeding mechanism includes: a housing including a depositing port communicating with the feeding port, the housing storing the material; and a rotating member housed in the housing and capable of rotating along an inner edge of the housing. A plurality of through-holes are provided in the rotating member at intervals along an outer circumference of the rotating member. When the rotating member rotates and any one of the plurality of through-holes and the depositing port communicate, the material stored in the housing is fed from the feeding port to the plasticizing mechanism through the depositing port.

What is claimed is:
1. A plasticizing device comprising:
a plasticizing mechanism including a screw, a feeding port for receiving a material, and a first driving motor that rotates the screw, the plasticizing mechanism being configured to plasticize the material to generate a melted material; and
a material feeding mechanism configured to feed the material to the plasticizing mechanism, wherein
the material feeding mechanism includes:
 a housing including a depositing port communicating with the feeding port, the housing storing the material;
 a rotator housed in the housing and configured to rotate along an inner edge of the housing; and
 a second driving motor that rotates the rotator,
a plurality of through-holes are provided in the rotator at intervals along an outer circumference of the rotator,
when the rotator rotates around a rotating shaft and any one of the plurality of through-holes and the depositing port communicate, the material stored in the housing is fed from the feeding port to the plasticizing mechanism through the depositing port,
the material feeding mechanism includes a cover provided above the rotator and covering a part of the rotator, the rotating shaft being received by a portion of the cover,
the cover is positioned along an outer circumference of the rotating shaft and overlaps the depositing port,
a communication hole for enabling the plurality of through-holes and the depositing port to communicate is provided in the housing, when viewed from a rotation axis direction of the rotator, an end portion of the communication hole on an opposite side of the depositing port is provided in a position overlapping the cover, the material feeding mechanism includes an elastic member configured to elongate and contract to adjust a clearance between the rotator and the cover during feeding of the material to the feeding port, the elastic member having a first end connected to an upper surface of the cover and a second end connected to the housing, the elastic member urging the cover to the rotator, the plasticizing device further includes:
  a processor; and
  a memory including instructions that, when executed by the processor, cause the processor to control the first driving motor and the second driving motor, and
when a torque value of the first driving motor is smaller than a predetermined value, the processor controls the second driving motor such that a rotating speed of the rotator is higher compared with when the torque value of the first driving motor is larger than the predetermined value.

2. The plasticizing device according to claim 1, wherein the material is in a pellet form, and the clearance between the rotator and the cover is equal to or smaller than a longest dimension of the material.

3. The plasticizing device according to claim 1,
  wherein the instructions, when executed by the processor, cause the processor to control a first material sensor that detects the material in the housing, and
  wherein the material is supplied to the housing based on a detection result of the first material sensor.

4. The plasticizing device according to claim 1, wherein the processor controls the rotator based on a rotating speed of the screw.

5. The plasticizing device according to claim 1, wherein the instructions, when executed by the processor, further cause the processor to control the second driving motor that rotates the rotator, and
  when a torque value of the second driving motor is larger than a predetermined value, the rotator rotates in an opposite direction of a rotating direction in which the rotator rotates when the torque value of the second driving motor is smaller than the predetermined value.

6. The plasticizing device according to claim 1, wherein the screw has a groove forming surface on which a groove is provided,
  the groove includes the feeding port,
  the plasticizing mechanism includes a barrel having an opposed surface opposed to the groove forming surface, and
  a communication hole communicating with the groove is provided on the opposed surface.

7. The plasticizing device according to claim 1, wherein the instructions, when executed by the processor, further cause the processor to control a second material sensor that detects the material in a feeding path connecting the depositing port and the feeding port, and
  the screw stops a rotation when the second material sensor detects material shortage.

8. The plasticizing device according to claim 1, wherein the material feeding mechanism includes a cooler positioned in a bottom of the housing and configured to cool the material.

9. The plasticizing device according to claim 1, wherein the material feeding mechanism feeds the material containing metal particles and thermoplastic resin.

10. An injection molding apparatus comprising:
  a plasticizing device that plasticizes a material into a melted material; and
  a nozzle that ejects, to a mold, the melted material fed from the plasticizing device, wherein
  the plasticizing device includes:
    a plasticizing mechanism including a screw, a feeding port for receiving the material, and a first driving motor that rotates the screw, the plasticizing mechanism being configured to plasticize the material to generate the melted material; and
    a material feeding mechanism configured to feed the material to the plasticizing mechanism,
  the material feeding mechanism includes:
    a housing including a depositing port communicating with the feeding port, the housing storing the material;
    a rotator housed in the housing and configured to rotate along an inner edge of the housing; and
    a second driving motor that rotates the rotator,
  a plurality of through-holes are provided in the rotator at intervals along an outer circumference of the rotator,
  when the rotator rotates around a rotating shaft and any one of the plurality of through-holes and the depositing port communicate, the material stored in the housing is fed from the feeding port to the plasticizing mechanism through the depositing port,
  the material feeding mechanism includes a cover provided above the rotator and covering a part of the rotator, the rotating shaft being received by a portion of the cover,
  the cover is positioned along an outer circumference of the rotating shaft and overlaps the depositing port,
  a communication hole for enabling the plurality of through-holes and the depositing port to communicate is provided in the housing,
  when viewed from a rotation axis direction of the rotator, an end portion of the communication hole on an opposite side of the depositing port is provided in a position overlapping the cover,
  the material feeding mechanism includes an elastic member configured to elongate and contract to adjust a clearance between the rotator and the cover during feeding of the material to the feeding port, the elastic member having a first end connected to an upper surface of the cover and second end connected to the housing, the elastic member urging the cover to the rotator,
  wherein the plasticizing device includes:
    a processor;
    a memory including instructions that, when executed by the processor, cause the processor to control the first driving motor and the second driving motor, and
  when a torque value of the first driving motor is smaller than a predetermined value, the processor controls the second driving motor such that a rotating speed of the rotator is higher compared with when the torque value of the first driving motor is larger than the predetermined value.

11. A three-dimensional shaping apparatus that shapes a three-dimensional shaped object, the three-dimensional shaping apparatus comprising:
  a plasticizing device that plasticizes a material into a melted material; and a nozzle that discharges, toward a stage, the melted material fed from the plasticizing device, wherein the plasticizing device includes:

a plasticizing mechanism including a screw, a feeding port for receiving the material, and a first driving motor that rotates the screw, the plasticizing mechanism being configured to plasticize the material to generate the melted material; and a material feeding mechanism configured to feed the material to the plasticizing mechanism, the material feeding mechanism includes:

a housing including a depositing port communicating with the feeding port, the housing storing the material;

a rotator housed in the housing and configured to rotate along an inner edge of the housing; and a second driving motor that rotates the rotator, a plurality of through-holes are provided in the rotator at intervals along an outer circumference of the rotator, when the rotator rotates around a rotating shaft and any one of the plurality of through-holes and the depositing port communicate, the material stored in the housing is fed from the feeding port to the plasticizing mechanism through the depositing port, the material feeding mechanism includes a cover provided above the rotator and covering a part of the rotator, the rotating shaft being received by a portion of the cover, the cover is positioned along an outer circumference of the rotating shaft and overlaps the depositing port, a communication hole for enabling the plurality of through-holes and the depositing port to communicate is provided in the housing, when viewed from a rotation axis direction of the rotator, an end portion of the communication hole on an opposite side of the depositing port is provided in a position overlapping the cover, the material feeding mechanism includes an elastic member configured to elongate and contract to adjust a clearance between the rotator and the cover during feeding of the material to the feeding port, the elastic member having a first end connected to an upper surface of the cover and second end connected to the housing, the elastic member urging the cover to the rotator, wherein the plasticizing device includes:

a processor;

a memory including instructions that, when executed by the processor, cause the processor to control the first driving motor and the second driving motor, and when a torque value of the first driving motor is smaller than a predetermined value, the processor controls the second driving motor such that a rotating speed of the rotator is higher compared with when the torque value of the first driving motor is larger than the predetermined value.

12. The plasticizing device according to claim 1, wherein the rotation axis direction of the rotator is parallel to a vertical direction.

13. The plasticizing device according to claim 1, wherein the upper surface of the cover is inclined such that, when the material is located on the upper surface, the material is guided to the rotator not covered by the cover.

14. The plasticizing device according to claim 4, wherein the processor controls the first driving motor and the second driving motor so as to rotate the rotator at a first speed when the screw is rotating at a second speed, and rotate the rotator at a third speed when the screw is rotating at a fourth speed, the first speed being greater than the third speed and the second speed being greater than the fourth speed.

15. The plasticizing device according to claim 8, the cooler has a cooling pipe through which a coolant flows, and the cooling pipe is provided in the housing closer to the depositing port than the rotator.

* * * * *